United States Patent
Tarr et al.

(10) Patent No.: US 10,156,393 B2
(45) Date of Patent: Dec. 18, 2018

(54) STAND-ALONE ICE MAKING APPLIANCE

(71) Applicant: Haier US Appliance Solutions, Inc., Wilmington, DE (US)

(72) Inventors: Ronald Scott Tarr, Louisville, KY (US); Samuel DuPlessis, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 217 days.

(21) Appl. No.: 15/260,368

(22) Filed: Sep. 9, 2016

(65) Prior Publication Data

US 2018/0073792 A1  Mar. 15, 2018

(51) Int. Cl.
| | |
|---|---|
| *F25C 5/18* | (2018.01) |
| *F24F 3/16* | (2006.01) |
| *F25C 1/147* | (2018.01) |
| *F25C 5/187* | (2018.01) |
| *C02F 1/32* | (2006.01) |

(52) U.S. Cl.
CPC .............. *F25C 1/147* (2013.01); *C02F 1/325* (2013.01); *F25C 5/187* (2013.01); *C02F 2201/32* (2013.01); *C02F 2201/326* (2013.01); *C02F 2209/005* (2013.01); *C02F 2209/44* (2013.01); *C02F 2303/04* (2013.01); *C02F 2307/12* (2013.01); *F25C 2400/10* (2013.01); *F25C 2400/12* (2013.01); *F25C 2400/14* (2013.01); *F25C 2600/04* (2013.01)

(58) Field of Classification Search
CPC .. F25C 1/147; F25C 5/187; F25C 5/18; F25C 5/182; F25C 2400/10; F25C 2400/12; F25C 2400/14; F25C 2500/04; F25C 2600/04; F25C 2700/00; F25C 2600/02; C02F 2201/32; C02F 2201/326; C02F 2209/005; C02F 2209/44; C02F 2303/04; C02F 2307/12
USPC .................................................. 62/78
See application file for complete search history.

(56) References Cited

U.S. PATENT DOCUMENTS

| | | | |
|---|---|---|---|
| 6,153,105 | A | 11/2000 | Tadlock et al. |
| 7,029,587 | B2 | 4/2006 | Andrews |

(Continued)

FOREIGN PATENT DOCUMENTS

| | | |
|---|---|---|
| JP | 03380830 B2 | 2/2003 |
| JP | 2015001312 A | 1/2015 |
| KR | 1227158 B1 | 1/2013 |

*Primary Examiner* — Joseph Trpisovsky
(74) *Attorney, Agent, or Firm* — Dority & Manning, P.A.

(57) ABSTRACT

A stand-alone ice making appliance and method of operation is provided. The stand-alone ice making appliance may include a container defining a first storage volume for receipt of ice, a water storage volume in fluid communication with the container to receive water from the container, an ice maker, a pump, and an ultraviolet light source. The ice maker may include an auger at least partially surrounded by a casing. The casing may be in fluid communication with the water storage volume to receive water from the water storage volume. The ice maker may further include a sealed refrigeration system in thermal communication with the casing. The pump may be in fluid communication with water storage volume for actively flowing water from the water storage volume to the ice maker. The ultraviolet light source may face the water storage volume to selectively direct ultraviolet light into the water storage volume.

18 Claims, 7 Drawing Sheets

(56) References Cited

U.S. PATENT DOCUMENTS

| | | | |
|---|---|---|---|
| 2003/0010054 A1* | 1/2003 | Esch | A47F 3/0439 |
| | | | 62/354 |
| 2009/0272130 A1* | 11/2009 | Kim | F25C 5/187 |
| | | | 62/66 |
| 2015/0158741 A1* | 6/2015 | Lee | C02F 1/003 |
| | | | 210/184 |
| 2016/0216019 A1* | 7/2016 | Rugieri | C02F 1/02 |

* cited by examiner

STAND-ALONE ICE MAKING APPLIANCE

FIELD OF THE INVENTION

The present subject matter relates generally to ice making appliances, and more particularly to ice making appliances that produce nugget ice.

BACKGROUND OF THE INVENTION

Ice makers generally produce ice for the use of consumers, such as in drinks being consumed, for cooling foods or drinks to be consumed and/or for other various purposes. Certain refrigerator appliances include ice makers for producing ice. The ice maker can be positioned within the appliance's freezer chamber and direct ice into an ice bucket where it can be stored within the freezer chamber. Such refrigerator appliances can also include a dispensing system for assisting a user with accessing ice produced by the refrigerator appliance's ice maker. However, the incorporation of ice makers into refrigerator appliances can have drawbacks, such as limits on the amount of ice that can be produced and the reliance on the refrigeration system of the refrigerator appliance to form the ice.

Recently, stand-alone ice makers have been developed. These ice makers are separate from refrigerator appliances and provide independent ice supplies. Generally, water may be provided to the ice maker, e.g., by a user, and/or recirculated from melted ice. However, water provided to the appliance may harbor certain undesirable chemicals or germs. Even if water is initially sanitary, undesirable elements may be introduced to an ice container. For instance, the water may carry those elements to other portions of the ice maker. Nonetheless, many stand-alone ice makers fail to account for these concerns.

Accordingly, improved stand-alone ice makers are desired in the art. In particular, cost-effective stand-alone ice makers that address several of the above issues would be advantageous.

BRIEF DESCRIPTION OF THE INVENTION

Aspects and advantages of the invention will be set forth in part in the following description, or may be obvious from the description, or may be learned through practice of the invention.

In one aspect of the present disclosure, a stand-alone ice making appliance is provided. The stand-alone ice making appliance may include a container defining a first storage volume for receipt of ice, a water storage volume in fluid communication with the container to receive water from the container, an ice maker, a pump, and an ultraviolet light source. The ice maker may include an auger at least partially surrounded by a casing. The casing may be in fluid communication with the water storage volume to receive water from the water storage volume. The ice maker may further include a sealed refrigeration system in thermal communication with the casing. The pump may be in fluid communication with water storage volume for actively flowing water from the water storage volume to the ice maker. The ultraviolet light source may face the water storage volume to selectively direct ultraviolet light into the water storage volume.

In another aspect of the present disclosure, a stand-alone ice making appliance is provided. The stand-alone ice making appliance may include a container, a water tank, a pump, a reservoir, an ice maker, a chute, and an ultraviolet light source. The container may define a first storage volume for receipt of ice. The water tank may define a second storage volume for receipt of water from the container. The pump may be in fluid communication with the second storage volume for actively flowing water from the water tank. The reservoir may define a third storage volume. The third storage volume may be in fluid communication with the pump for receiving water that is actively flowed from the water tank. The ice maker may include an auger at least partially surrounded by a casing. The casing may be fluid communication with the third storage volume to receive water from the reservoir. The ice maker may further include a sealed refrigeration system in thermal communication with the casing. The chute may extend between the ice maker and the container for directing ice produced by the ice maker towards the first storage volume. The ultraviolet light source may be disposed above the reservoir along the vertical direction to selectively direct ultraviolet light into the third storage volume.

In yet another aspect of the present disclosure, a method of controlling an ultraviolet light source of a stand-alone ice making appliance is provided. The appliance may include a container defining a first storage volume for receipt of ice, a water storage volume facing the ultraviolet light source in fluid communication with the container, and an ice maker. The ice maker may include an auger at least partially surrounded by a casing. The casing may be fluid communication with the water storage volume. The method may include detecting a position of the container, determining a sanitation condition in response to detecting a position of the container, and activating the ultraviolet light source based on the determined sanitation condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
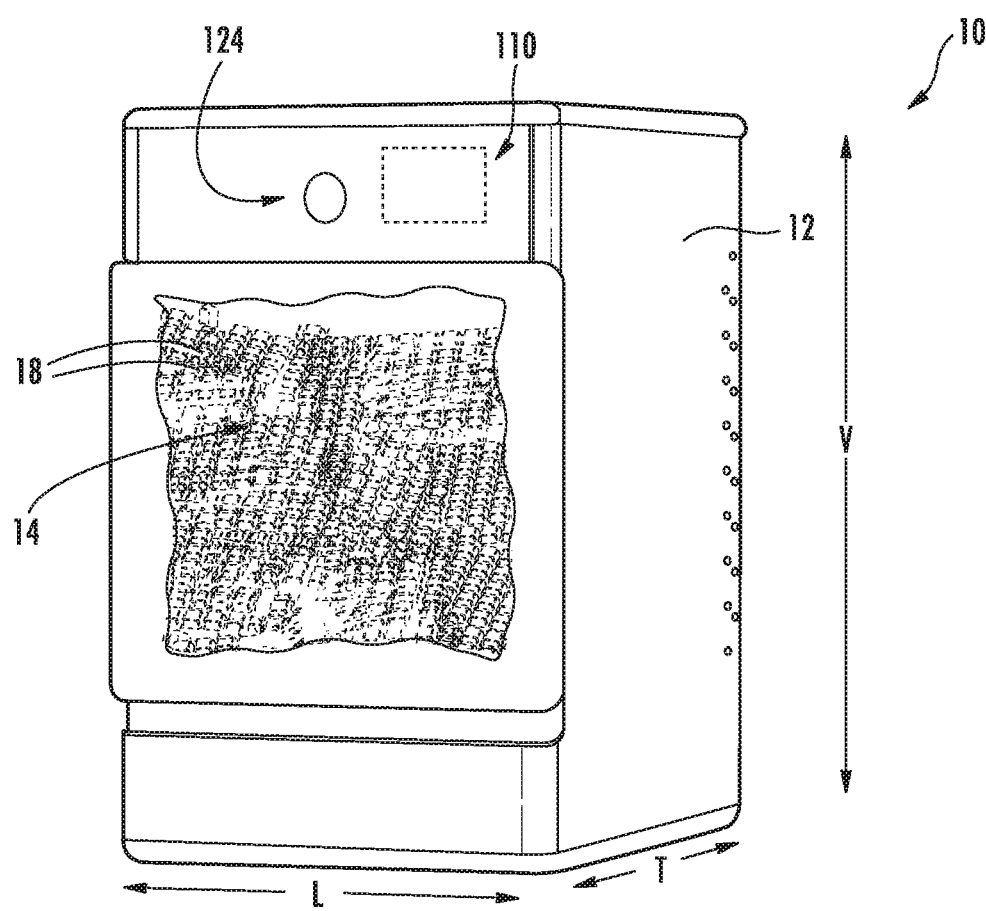
FIG. 1 provides a perspective view of an appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In some aspects of the present disclosure, an ice making appliance, including a container for storing ice is provided. A container or reservoir may also be provided for storing water that can be used to create ice. Above the container or reservoir, an ultraviolet light source may be provided. The ultraviolet light source may be configured to selectively sanitize water within the container or reservoir.

Referring now to FIGS. 1 through 4, one embodiment of an appliance 10 in accordance with the present disclosure is illustrated. As shown, appliance 10 is provided as a stand-alone ice making appliance embodiment. Appliance 10 includes an outer casing 12 which defines a primary opening 11 and an internal cavity or volume 13. Internal volume 13 generally at least partially houses various other components of the appliance therein 10. Primary opening 11 defined in outer casing 12 may extend from internal volume 13 to an ambient environment. Through primary opening 11, access (e.g., by a user) to the internal volume 13 may be permitted. In some embodiments, an enclosed chamber 15 is further defined within outer casing. Outer casing 12 and/or one or more internal partitions 17 may define an enclosed chamber 15 as separate and visually isolated from primary opening 11. Outer casing 12 further defines a vertical direction V, a lateral direction L, and a transverse direction T. The vertical direction V, lateral direction L, and transverse direction T are all mutually perpendicular and form an orthogonal direction system.

A container 14 of appliance 10 is also illustrated. Container 14 defines a first storage volume 16 for the receipt and storage of ice 18 therein. A user of the appliance 10 may access ice 18 within the container 14 for consumption or other uses, as described in detail below. Container 14 may include one or more sidewalls 20 and a base wall 22, which may together define the first storage volume 16. In exemplary embodiments, at least one sidewall 20 may be formed from a clear, see-through (i.e., transparent or translucent) material, such as a clear glass or plastic, such that a user can see into the first storage volume 16 and thus view ice 18 therein. For instance, at least one sidewall 20 may include a separate front panel and rear panel formed from a clear, see-through (i.e., transparent or translucent) material, such as a clear glass or plastic.

Figure 2:
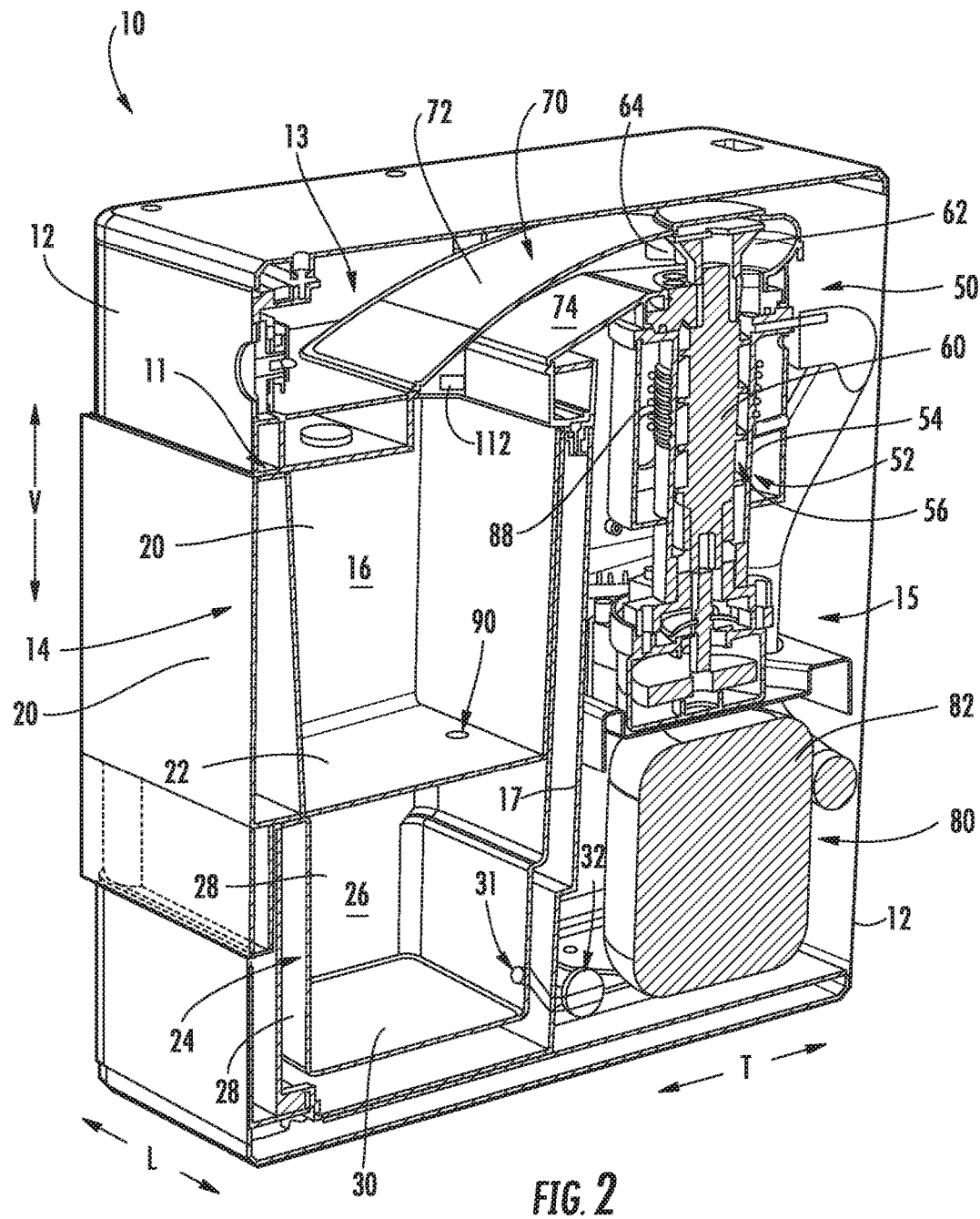
FIG. 2 provides a perspective sectional view of an appliance according to an exemplary embodiment of the present disclosure.
Figure 3:
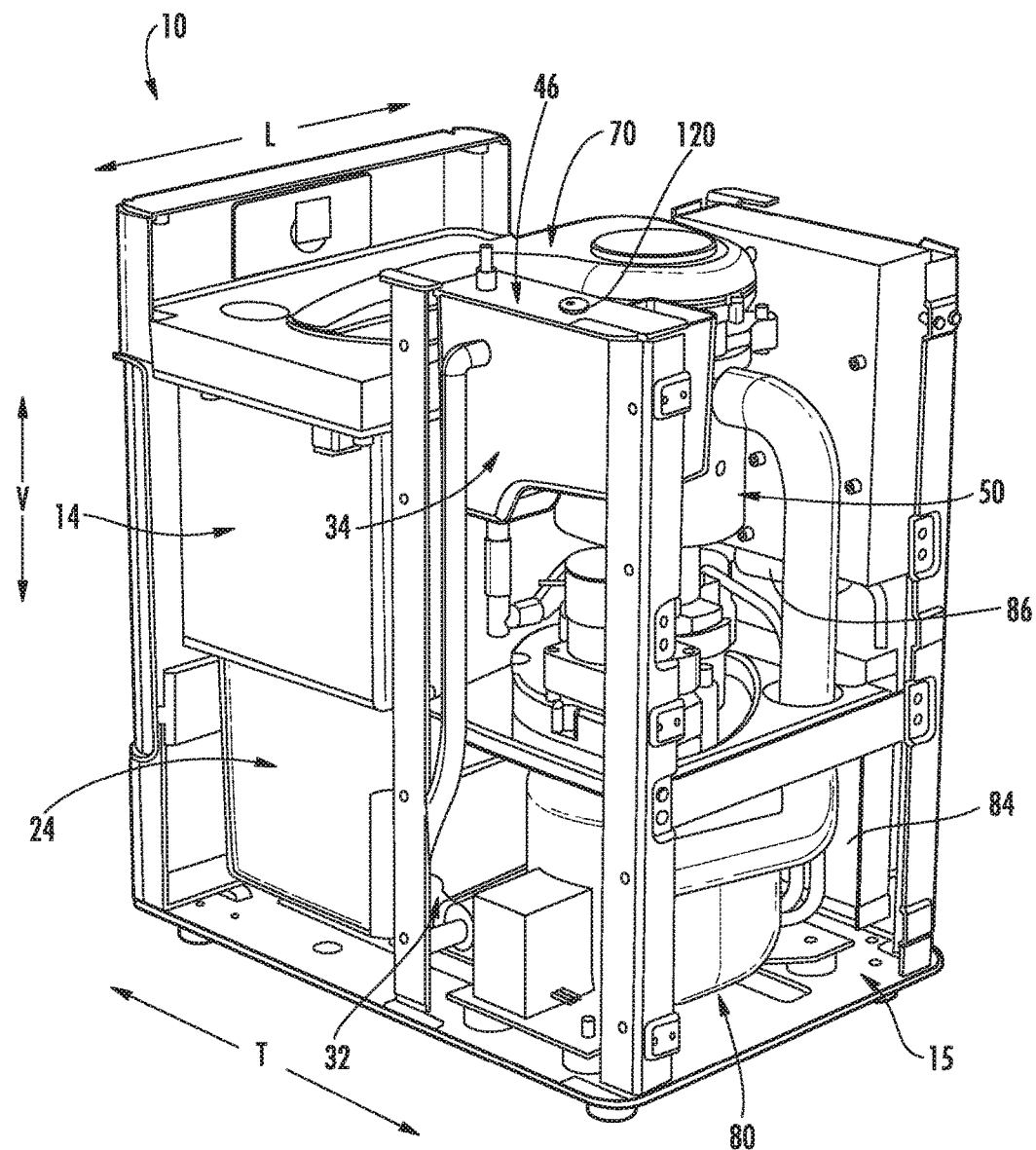
FIG. 3 provides a rear perspective view (with a casing removed) of an appliance according to an exemplary embodiment of the present disclosure.
Figure 4:
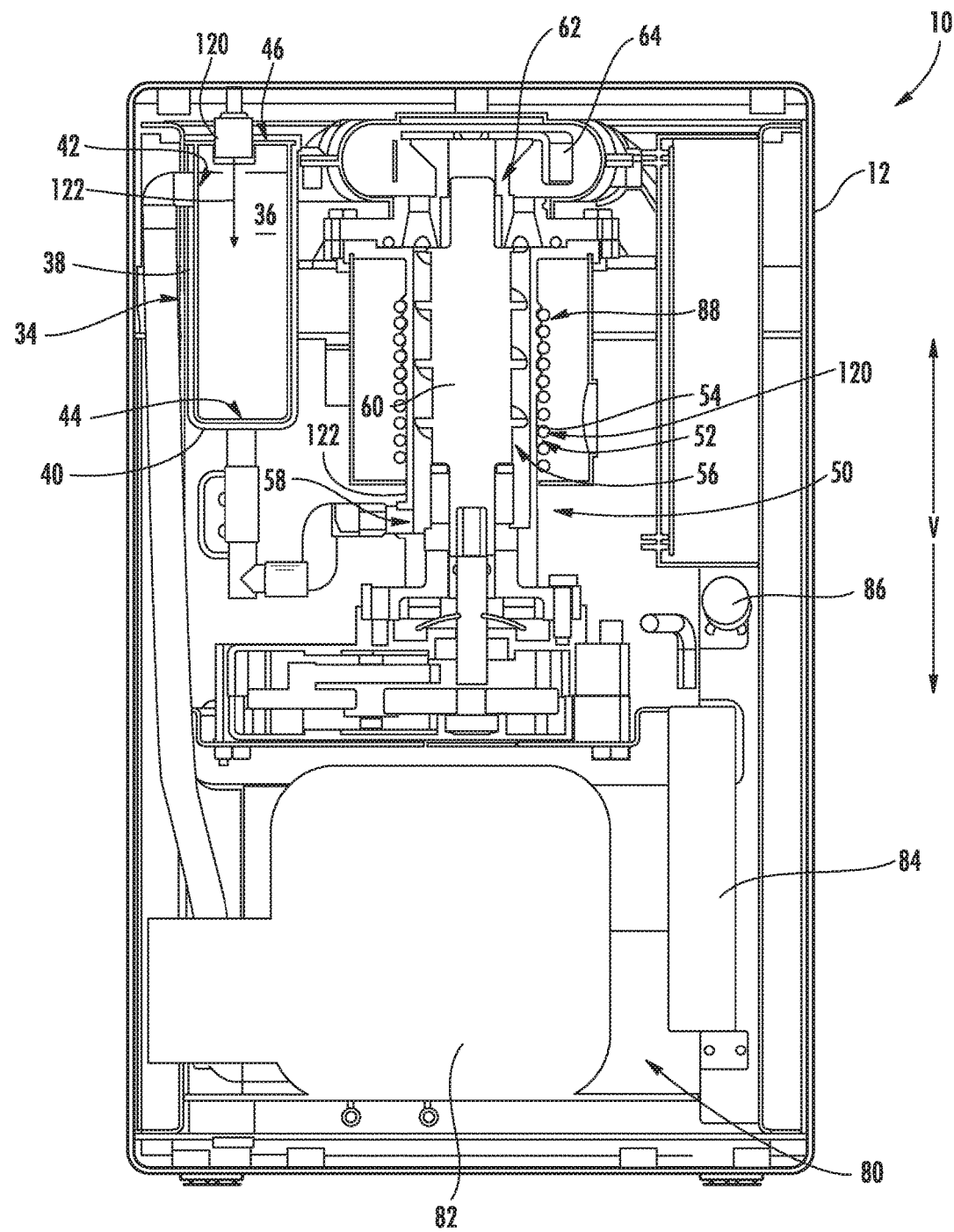
FIG. 4 provides a rear sectional view of an appliance according to an exemplary embodiment of the present disclosure.

In exemplary embodiments, container 14 is selectively removable, such as from the outer casing 12, by a user. Being selectively removable may allow easy access by the user to ice within the container 14 and further, for example, may provide access to a water tank 24 of the appliance 10, as will be discussed below. In optional embodiments, a position sensor 112 is provided within internal volume 13 to detect a position of container 14. According to detection, e.g., at a predetermined position, position sensor 112 may transmit a location signal. For instance, position sensor 112 may detect if and/or when container 14 is fully mounted within internal volume 13, e.g., through opening 11 such that first storage volume 16 is contained within outer casing 12, as illustrated in FIG. 2. A location signal may be sent in response to such detection. When fully mounted, container 14 may extend from opening 11 to internal partition 17, e.g., outside of enclosed chamber 15. Position sensor 112 may include a contact switch configured to engage container 14 at a sidewall 20. Nonetheless, Applicants note that position sensor 112 may, additionally or alternatively, include one or more other suitable sensors to detect if and/or when container 14 is mounted at a predetermined position.

Appliances 10 in accordance with the present disclosure are advantageously stand-alone appliances, and thus are not connected to refrigerators or other appliances. Additionally, in exemplary embodiments, such appliances are not connected to plumbing or another water source that is external to the appliance 10, such as a refrigerator water source. Rather, in exemplary embodiments, water is initially supplied to the appliance 10 manually by a user, such as by pouring water into water tank 24 and/or a reservoir.

Notably, appliances 10 as discussed herein include various features which allow the appliances 10 to be affordable and desirable to typical consumers. For example, the stand-alone feature reduces the cost associated with the appliance 10 and allows the consumer to position the appliance 10 at any suitable desired location, with the only requirement in some embodiments being access to an electrical source. In exemplary embodiments, such as those shown in FIGS. 1 through 4, the removable container 14 allows easy access to ice 18 within first storage volume 16 and allows the container 14 to be moved to a different position from the remainder of the appliance 10 for ice usage purposes.

Referring to FIGS. 1 through 5, various components of appliances 10 in accordance with the present disclosure are illustrated. For example, as mentioned, appliance 10 includes a water tank 24. The water tank 24 defines water storage volume, e.g., second storage volume 26, for the receipt and holding of water. Water tank 24 may include one or more sidewalls 28 and a base wall 30 which may together define the second storage volume 26. In exemplary embodiments, the water tank 24 may be disposed below the container 14 along the vertical direction V defined for the appliance 10, as shown.

As discussed, in exemplary embodiments, water is provided to the water tank 24 for use in forming ice. Accordingly, appliance 10 may further include a pump 32. Pump 32 may be in fluid communication with the second storage volume 26. For example, water may be flowable from the second storage volume 26 through an opening 31 defined in the water tank 24, such as in a sidewall 28 thereof, and may flow through a conduit to and through pump 32. Pump 32 may, when activated, actively flow water from the second storage volume 26 therethrough and from the pump 32. In optional embodiments, pump 32 is disposed within enclosed chamber 15. One or more conduits may extend through partition 17 between opening 31 and pump 32 in fluid communication with second storage volume 26.

Water actively flowed from the pump 32 may be flowed (e.g., through a suitable conduit) to a reservoir 34. For example, reservoir 34 may define another water storage volume, e.g., a third storage volume 36. In some embodiments, third storage volume 36 is defined by one or more sidewalls 38 and a base wall 40. Third storage volume 36 may, for example, be in fluid communication with the pump 32 and may thus receive water that is actively flowed from the water tank 24, such as through the pump 32. Reservoir 34 may be disposed within enclosed chamber 15. During operation, water may be flowed into the third storage volume 36 through an opening 42 defined in the reservoir 34.

Figure 6:
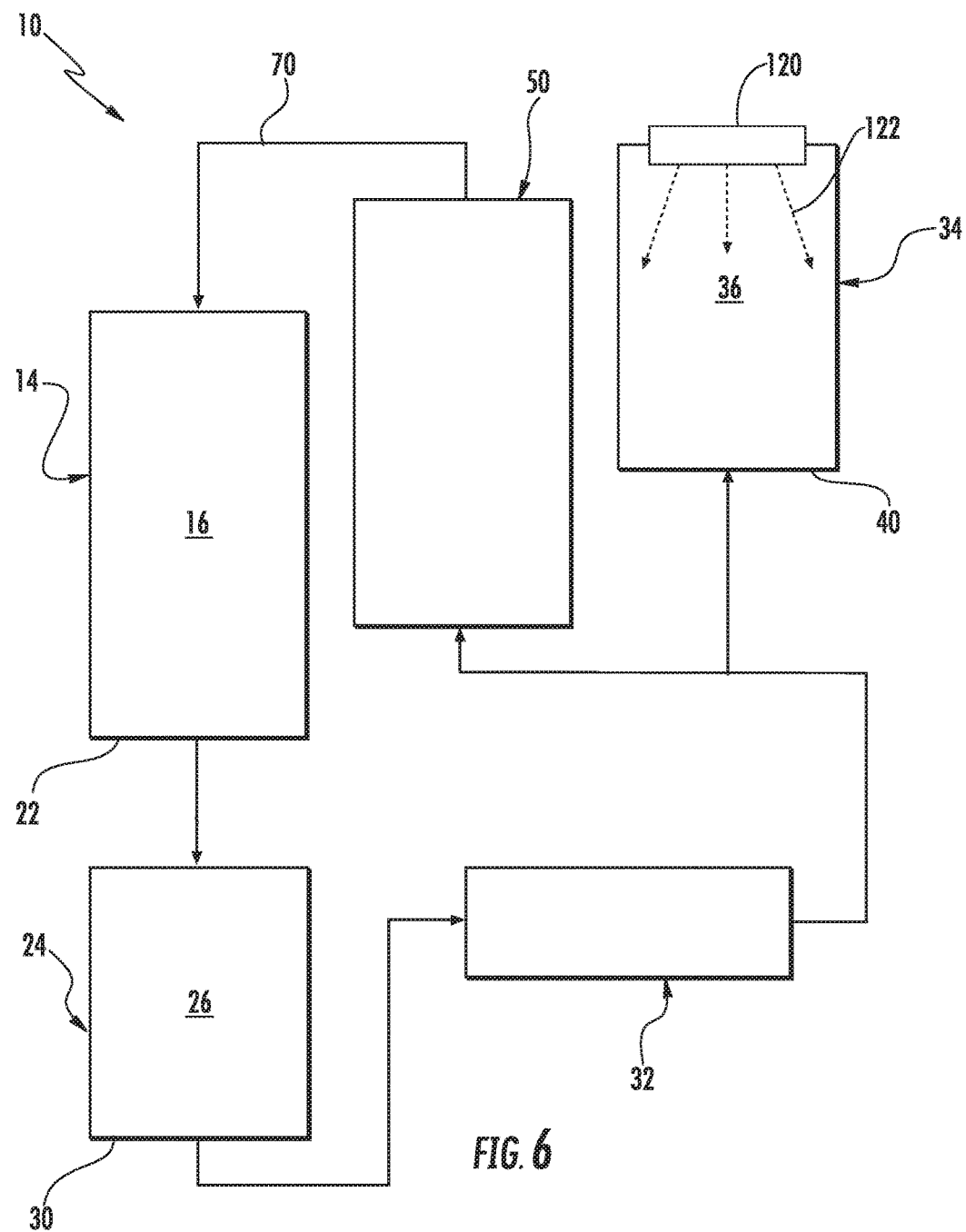
FIG. 6 provides a schematic diagram of an appliance according to an exemplary embodiment of the present disclosure.

Reservoir 34 and third storage volume 36 thereof may receive and contain water to be provided to an ice maker 50 for the production of ice. Accordingly, third storage volume 36 may be in fluid communication with ice maker 50. For example, water may be flowed, such as through an opening 44 and suitable conduits, from third storage volume 36 to ice maker 50. Optionally, openings 42 and 44 may be embodied as a single opening, e.g., extending through base wall 40 of reservoir 34, to alternately flow water to and from third storage volume 36 (see e.g., FIG. 6).

In some embodiments, an ultraviolet light source 120 is provided to disinfect or sanitize water before it reaches ice maker 50. Ultraviolet light source 120 may face one or more water storage volumes (e.g., 26 and/or 36). For instance, ultraviolet light source 120 may be positioned above third storage volume 36, e.g., in the vertical direction V. In exemplary embodiments, such as that of FIGS. 1 through 5, the ultraviolet light source 120 is disposed over third storage volume 36. For instance, ultraviolet light source 120 may be mounted to a portion of reservoir 34 and directed into third storage volume 36. As will be described below, ultraviolet light source 120 may be selectively activated (e.g., for a predetermined amount of time) to disinfect or sanitize water within third storage volume 36.

Ice maker 50 generally receives water, such as sanitized water from reservoir 34, and freezes the water to form ice 18. As will be discussed below, water may be sanitized by exposure to ultraviolet light within appliance 10. Exposure to suitable wavelengths of ultraviolet light may serve to kill certain microorganisms or otherwise render those microorganisms inactive via disruption to the microorganisms' nucleic acids and DNA. Advantageously, sanitizing water prior to it being frozen may ensure the ice remains sanitary. Moreover, substantially all of the resulting ice may be sanitized, minimizing the potential for cross-contamination or the potential that some portion of the ice may not be subjected to the sanitizing emissions of the ultraviolet light source 120. In exemplary embodiments, ice maker 50 is a nugget ice maker, and in particular is an auger-style ice maker, although other suitable styles of ice makers and/or appliances are within the scope and spirit of the present disclosure. As shown, ice maker 50 may include a casing 52 into which water from third storage volume 36 is flowed. Casing 52 is thus in fluid communication with third storage volume 36. For example, casing 52 may include one or more sidewalls 54 which may define an interior volume 56, and an opening 58 may be defined in a sidewall 54. Water may be flowed from third storage volume 36 through the opening 58 (such as via a suitable conduit) into the interior volume 56.

As illustrated, an auger 60 may be disposed at least partially within the casing 52. During operation, the auger 60 may rotate. Water within the casing 52 may at least partially freeze due to heat exchange, such as with a refrigeration system as discussed herein. The at least partially frozen water may be lifted by the auger 60 from casing 52. Further, in exemplary embodiments, the at least partially frozen water may be directed by auger 60 to and through an extruder 62. The extruder 62 may extrude the at least partially frozen water to form ice, such as nuggets of ice 18.

Formed ice 18 may be provided by the ice maker 50 to container 14, and may be received in the first storage volume 16 thereof. For example, ice 18 formed by auger 60 and/or extruder 62 may be provided to the container 14. In exemplary embodiments, appliance 10 includes a chute 70 for directing ice 18 produced by the ice maker 50 towards the first storage volume 16. For example, as shown, chute 70 is generally positioned above container 14 along the vertical direction V. Thus, ice can slide off of chute 70 and drop into first storage volume 16 of container 14. Chute 70 may, as shown, extend between ice maker 50 and container 14, and may include a body 72 which defines a passage 74 therethrough. Ice 18 may be directed from the ice maker 50 (such as from the auger 60 and/or extruder 62) through the passage 74 to the container 14. In some embodiments, for example, a sweep 64, which may for example be connected to and rotate with the auger, may contact the ice emerging through the extruder 62 from the auger 60 and direct the ice through the passage 74 to the container 14.

As discussed, water within the casing 52 may at least partially freeze due to heat exchange, such as with a refrigeration system. In exemplary embodiments, ice maker 50 may include a sealed refrigeration system 80. The sealed refrigeration system 80 may be in thermal communication with the casing 52 to remove heat from the casing 52 and interior volume 56 thereof, thus facilitating freezing of water therein to form ice. Sealed refrigeration system 80 may, for example, include a compressor 82, a condenser 84, a throttling device 86, and an evaporator 88. Evaporator 88 may, for example, be in thermal communication with the casing 52 in order to remove heat from the interior volume 56 and water therein during operation of sealed system 80. For example, evaporator 88 may at least partially surround the casing 52. In particular, evaporator 88 may be a conduit coiled around and in contact with casing 52, such as the sidewall(s) 54 thereof. One or more of compressor 82, condenser 84, throttling device 86, or evaporator 88 may be disposed within enclosed chamber 15.

During operation of sealed system 80, refrigerant exits evaporator 88 as a fluid in the form of a superheated vapor and/or vapor mixture. Upon exiting evaporator 88, the refrigerant enters compressor 82 wherein the pressure and temperature of the refrigerant are increased such that the refrigerant becomes a superheated vapor. The superheated vapor from compressor 82 enters condenser 84 wherein energy is transferred therefrom and condenses into a saturated liquid and/or liquid vapor mixture. This fluid exits condenser 84 and travels through throttling device 86 that is configured for regulating a flow rate of refrigerant therethrough. Upon exiting throttling device 86, the pressure and temperature of the refrigerant drop at which time the refrigerant enters evaporator 88 and the cycle repeats itself. In certain exemplary embodiments, throttling device 86 may be a capillary tube. Notably, in some embodiments, sealed system 80 may additionally include fans (not shown) for facilitating heat transfer to/from the condenser 84.

As discussed, in exemplary embodiments, ice 18 may be nugget ice. Nugget ice is ice that that is maintained or stored (i.e., in first storage volume 16 of container 14) at a temperature greater than the melting point of water or greater than about thirty-two degrees Fahrenheit. Accordingly, the ambient temperature of the environment surrounding the container 14 may be at a temperature greater than the melting point of water or greater than about thirty-two degrees Fahrenheit. In some embodiments, such temperature may be greater than forty degrees Fahrenheit, greater than fifty degrees Fahrenheit, or greater than 60 degrees Fahrenheit.

Figure 5:
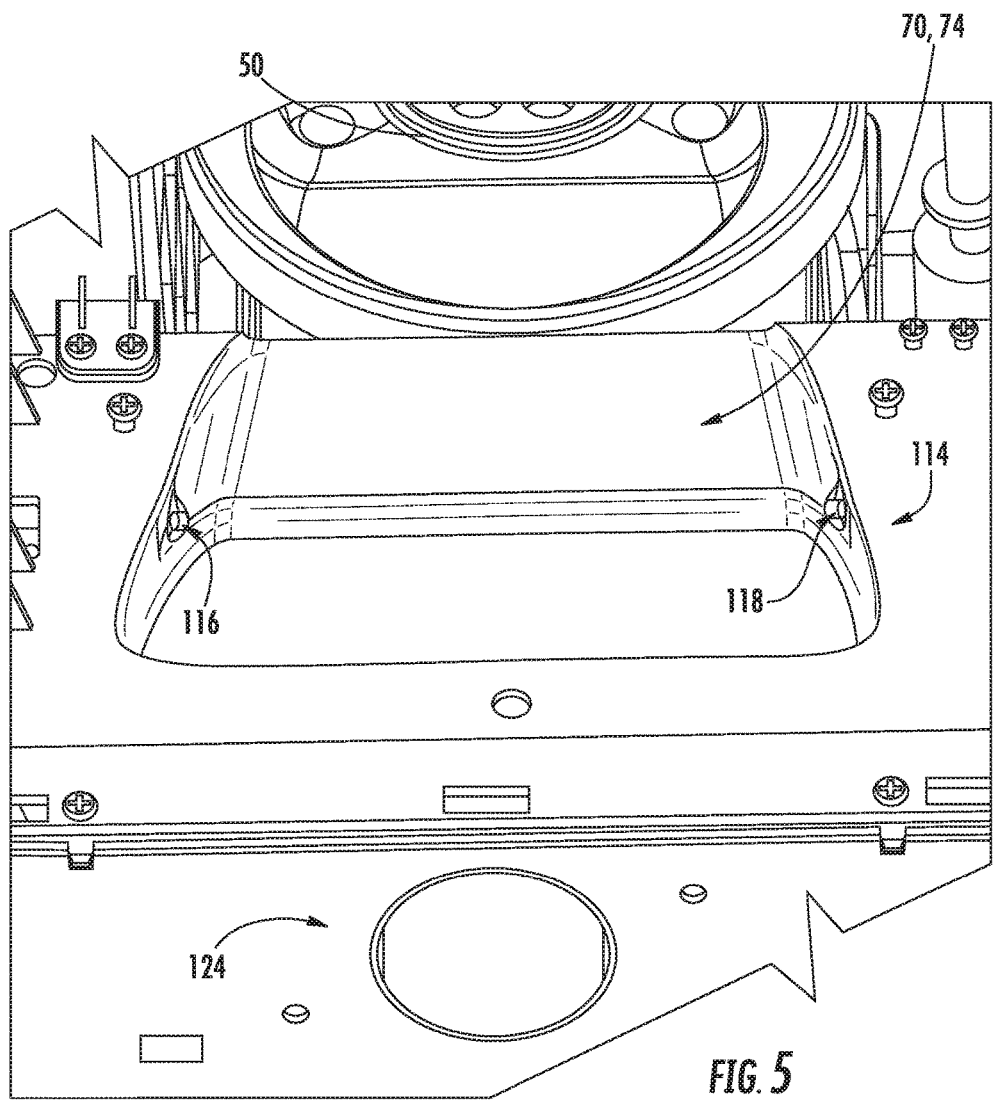
FIG. 5 provides an overhead perspective view of an internal portion of an appliance according to an exemplary embodiment of the present disclosure.

In optional embodiments, such as those illustrated in FIG. 5, one or more ice level sensors 114 are provided proximate to container 14. Ice level sensor 114 may be positioned above container, e.g., in the vertical direction V. For example, ice level sensor 114 may be mounted within internal volume 13 between ice maker 50 and first storage volume 16. As ice fills first storage container 14, ice level sensor 114 may detect if and/or when a mass of ice has exceeded a predetermined level (e.g., vertical position) within first storage volume 16. For instance, ice level sensor 114 may transmit a filled signal in response to ice exceeding a certain predetermined level.

In some such embodiments, ice level sensor 114 includes a beam break sensor. During operations the beam break sensor may generate one or more beams of infrared light that span a distance between an emitter 116 and receiver 118. One or more beams may span across a portion of first storage volume 16 and/or chute 70, e.g., in the lateral direction L or transverse direction T. In exemplary embodiments, such as the embodiment shown in FIG. 6, emitter 116 and receiver 118 are placed at opposite sides of chute 70. Ice that exceeds the vertical limit of first storage volume 16 (e.g., when ice maker 50 is not actively producing ice) may break the beam spanning emitter 116 and receiver 118 to indicate that container 14 and first storage volume 16 are full. A filled signal may be transmitted in response to the broken signal. Applicants note that although a break beam sensor is described, ice level sensor 114 may include any suitable sensor to detect the position of ice within first storage volume 16. For instance, certain additional or alternative embodiments of ice level sensor 114 may utilize an acoustic or laser range sensor. Distance from the range sensor may be calculated, for instance, based upon the time taken to receive a reflected acoustic sound or laser light signal at the range sensor from an initial acoustic sound or laser light signal transmitted by the range sensor.

Referring now to FIGS. 2 through 6, ice 18 held within the first storage volume 16 may gradually melt. The melting speed is increased for nugget ice due to the increased maintenance/storage temperature. Accordingly, drain features may advantageously be provided in the container for draining such melt water. Additionally, and advantageously, the melt water may in exemplary embodiments be recirculated and reused by appliance 10 to form ice.

For example, in some embodiments, such as those illustrated in FIG. 2, a drain aperture 90 may be defined in the base wall 22. Drain aperture 90 may allow water to flow from the first storage volume 16 and container 14 generally. Further, in exemplary embodiments, water flowing from the first storage volume 16 and container 14 may, due to gravity and the vertical alignment of the container 14 of water tank 24, flow into the second storage volume 26. From second storage volume 26, water may recirculate through pump 32 and/or third storage volume 36, before being refrozen as ice 18.

As noted above, water within one or more water storage volumes (e.g., 26 and/or 36) may be selectively sanitized by ultraviolet light source 120. Generally, ultraviolet light source 120 includes one or more ultraviolet light bulbs. For instance, an ultraviolet light emitting diode (LED) may be provided. Additionally or alternatively, another suitable ultraviolet light bulb, such as a fluorescent bulb or mercury-vapor bulb may be utilized.

During operation of ultraviolet light source 120, water, such as water within a water storage volume (e.g., 26 and/or 36), may be subjected to and disinfected by ultraviolet light waves or emissions 122. Ultraviolet light emissions 122 are generated by ultraviolet light source 120 and may be projected directly into water within a water storage volume (e.g., 26 and/or 36). Ultraviolet light emissions 122 are generally provided in a wavelength along the ultraviolet light spectrum. For instance, certain embodiments of the ultraviolet light emissions 122 are generated in the range of about 240 nanometers to about 270 nanometers. Optional embodiments of the ultraviolet light emissions 122 are 254 nanometers. Applicants note that the term "about," as used herein, may be understood to provide a value within 10 nanometers.

Ultraviolet light source 120, including an ultraviolet light bulb, is optionally mounted above third storage volume 36. In some such embodiments, ultraviolet light source 120 is disposed within enclosed chamber 15. Advantageously, ultraviolet light source 120 will be visually hidden from the ambient environment and/or users. Ultraviolet light emissions 122 may thus be contained inside enclosed chamber 15, protecting users' eyes and reducing the potential that ultraviolet light emissions 122 will escape to the ambient environment.

In optional embodiments, removable lid 46 is selectively positioned above reservoir 34. In a mounted position, removable lid 46 may be attached to reservoir 34, at least partially enclosing third storage volume 36. When lid 46 is removed or placed in an unmounted position, an upper opening defined by reservoir 32 may permit access to third storage volume 36, e.g., in the vertical direction V. Ultraviolet light source 120 may be attached to removable lid 46. Optionally, a portion of ultraviolet light source 120 may extend through removable lid 46 in selective or fixed attachment thereto.

In exemplary embodiments, appliance 10 may further include a controller 110. Controller 110 may, for example, be configured to operate the appliance 10 based on, for example, user inputs to the appliance 10 (such as to a user interface 124 (see FIG. 1) thereof), inputs from various sensors disposed within the appliance 10, and/or other suitable inputs. User interface 124 may, for example, include one or more switches, buttons, touch screens and/or other features that allow a user to transmit signals to the controller 110 to control operation of the appliance 10. Controller 110 may for example include one or more memory devices and one or more microprocessors, such as general or special purpose microprocessors operable to execute programming instructions or micro-control code associated with appliance 10 operation. The memory may represent random access memory such as DRAM, or read only memory such as ROM or FLASH. In one embodiment, the processor executes programming instructions stored in memory. The memory may be a separate component from the processor or may be included onboard within the processor.

In exemplary embodiments, controller 110 may be in operative communication with the pump 32. Such operative communication may be via a wired or wireless connection, and may facilitate the transmittal and/or receipt of signals by the controller 110 and pump 32. Controller 110 may be configured to activate the pump 32 to actively flow water. For example, controller 110 may activate the pump 32 to actively flow water therethrough when, for example, reservoir 34 requires water. A suitable sensor(s), for example, may be provided in the third storage volume 36. The sensor(s) may be in operative communication with the controller 110 may transmit signals to the controller 110 which indicate whether or not additional water is desired in the reservoir 34. When controller 110 receives a signal that water is desired, controller 110 may send a signal to pump 32 to activate that pump.

It should additionally be noted that, in exemplary embodiments, controller 110 may be in operative communication with the sealed system 80, such as with the compressor 82 thereof, and may activate the sealed system 80 as desired or required for ice making purposes.

In optional embodiments, controller 110 may be operative communication with ultraviolet light source 120, position sensor 112, and/or ice level sensor 114. Controller 110 may be configured to selectively operate (e.g., initiate ultraviolet light transmissions at) ultraviolet light source 120. For instance, controller 110 may determine when a sanitation condition exists. Generally, a sanitation condition indicates a state wherein sanitation of water (e.g., within third storage volume 36) is determined to be desirable. In other words, a sanitation condition may indicate that water needs to (or otherwise should) be sanitized. The sanitation condition may be contingent upon a single input to controller (e.g., at user interface 124) or may be based on multiple inputs and/or determinations.

In some such embodiments, one or more of position sensors 112 and/or ice level sensors 114 are provided in operative communication with controller 110. A sanitation condition may be determined when one or more predetermined circumstances or states occur. For instance, as described above, position sensor 112 may be configured to detect a position of container 14, such as when container 14 is mounted or disposed within appliance 10. Position sensor 112 may thus detect when container 14 is ready to receive ice from ice maker 50. Position sensor 112 may further be configured to transmit a corresponding location signal based upon the detected position. Location signal may be received at the controller 110 from position sensor 112. In response to position sensor 112 detecting position of container 14, as indicated by location signal, controller 110 may determine that a sanitation condition has been reached. A received location signal, alone or in combination with other detected or determined conditions, may be a factor in determining a sanitation condition has arisen. Controller 110 may activate ultraviolet light source 120, as described above, based on the determined sanitation condition.

In additional or alternative embodiments, controller 110 is configured to determine a sanitation condition based, at least in part, on receiving a signal from ice level sensor 114. For instance, determination of a sanitation condition may be made when a filled signal is received from ice level sensor 114 to indicate that container 14 is substantially filled or overflowing within ice.

In still further additional or alternative embodiments, controller 110 is configured to determine a sanitation condition based on an operation state of one or more portions of appliance 10. For instance, controller 110 may be configured determine an operation state of ice maker 50. Ceased operation of ice maker 50, alone or in combination with other detected or determined conditions, may be a factor in determining a sanitation condition has arisen. Optionally, controller 110 may be configured to measure a time period, such as an inactive time period. In some such embodiments, controller 110 is operable to measure the time period since ultraviolet light source 120 ceased operation. Upon measuring a prescribed or preset amount of time, controller 110 may determine sanitation of water is desirable or required.

Figure 7:
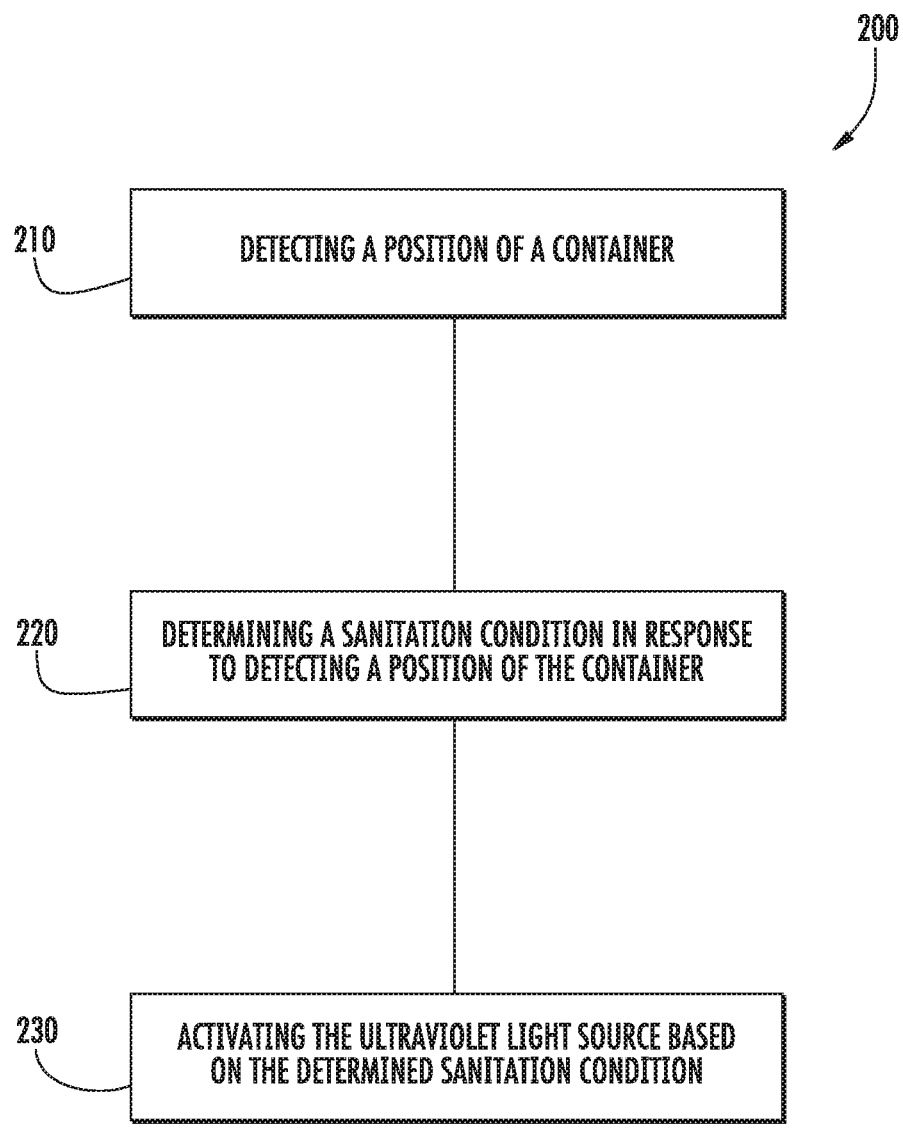
FIG. 7 provides a flow chart illustrating a method of operation of an appliance according to an exemplary embodiment of the present disclosure.

Turning now to FIG. 7, a flow diagram is provided of a method 200 according to an exemplary embodiment of the present disclosure. Generally, the method 200 provides for controlling user interface 100 in an appliance 10 (see FIG. 1) that includes an ultraviolet light source 120, container 14, and water storage volume (e.g., 26 and/or 36), as described above. The method 200 can be performed, for instance, by the controller 110. For example, controller 110 may be in communication with ultraviolet light source 120, position sensor 112, and ice level sensor 114. Controller 110 may send signals to and receive signals from one or more of ultraviolet light source 120, position sensor 112, or ice level sensor 114. Controller 110 may further be in communication with other suitable components of the appliance to facilitate operation of the appliance 10 (see FIG. 1) generally. FIG. 7 depicts steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure.

Referring to FIG. 7, at 210, the method 200 includes detecting a position of a container. For instance, 210 may include received a location signal from a position sensor. The location signal may be received and/or transmitted only upon the container being fully mounted within a desired portion of the appliance. As described above, the container may engage certain embodiments of the position sensor when fully mounted to indicate that the container is ready to receive ice.

At 220, the method 200 includes determining a sanitation condition in response to 210. Generally, 220 may indicate a determination that sanitation of water within the appliance is desirable. In some embodiments, 220 includes receiving a filled signal from an ice level sensor at a first storage volume of the container. The filled signal may be an active signal or the absence of a signal (e.g., when a corresponding light beam has been broken, as described above). The filled signal may be received and/or transmitted upon ice level sensor detecting that ice within the first storage volume has reached a maximum desired level. Filled signal may continue until a sufficient amount of ice is removed and/or melts. In additional or alternative embodiments, 220 includes determining an operation state of the ice maker. An inactive operation state may indicate a sanitation condition. In still further additional or alternative embodiments, 220 includes measuring an inactive time period of the ultraviolet light source. If the measured inactive time period exceeds a prescribed limit, a sanitation condition may be determined.

At 230, the method 200 includes activating the ultraviolet light source based on the determined sanitation condition of 220. As described above, activating the ultraviolet light source may include initiation projecting light waves in the range of about 240 nanometers to about 270 nanometers. In further embodiments, activating the ultraviolet light source includes initiation projecting light waves of 254 nanometers. Optionally, projection of ultraviolet light waves might occur over a predetermined period of time. For example, projection of light waves may be substantially constant over the predetermined period suitable to sanitize a known volume of water.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand-alone ice making appliance defining a vertical direction, the stand-alone ice making appliance comprising:
   a container defining a first storage volume for receipt of ice;
   a water storage volume in fluid communication with the container to receive water from the container;
   an ice maker, the ice maker comprising an auger at least partially surrounded by a casing, the casing in fluid communication with the water storage volume to receive water from the water storage volume, the ice maker further comprising a sealed refrigeration system in thermal communication with the casing;
   a pump in fluid communication with water storage volume for actively flowing water from the water storage volume to the ice maker;
   an ultraviolet light source facing the water storage volume to selectively direct ultraviolet light into the water storage volume;
   a position sensor to detect a position of the container; and
   a controller in operative communication with the position sensor, the controller being configured to
      detect the position of the container based on a signal received from the position sensor,
      determine a sanitation condition in response to the position of the container being detected, and
      activate the ultraviolet light source based on the determined sanitation condition.

2. The stand-alone ice making appliance of claim 1, further comprising:
   a water tank, the water tank defining a second storage volume for receipt of water from the container; and
   a reservoir defining a third storage volume, the third storage volume in fluid communication with the pump for receiving water that is actively flowed from the water tank,
   wherein the water storage volume is one of the second storage volume or the third storage volume.

3. The stand-alone ice making appliance of claim 2, wherein the reservoir includes a removable lid mounted above the third storage volume, and wherein the ultraviolet light source is attached to the removable lid.

4. The stand-alone ice making appliance of claim 2, wherein the container further defines a drain aperture above the water tank along the vertical direction in fluid communication with the second storage volume.

5. The stand-alone ice making appliance of claim 1, further comprising:
   an outer casing defining an enclosed internal cavity, wherein the ultraviolet light source is disposed within the enclosed internal cavity.

6. The stand-alone ice making appliance of claim 1, wherein the ultraviolet light source includes an ultraviolet light bulb to project light waves in the range of about 240 nanometers to about 270 nanometers.

7. A stand-alone ice making appliance defining a vertical direction, the stand-alone ice making appliance comprising:
   a container defining a first storage volume for receipt of ice;
   a water tank, the water tank defining a second storage volume for receipt of water from the container;
   a pump in fluid communication with the second storage volume for actively flowing water from the water tank;
   a reservoir defining a third storage volume, the third storage volume in fluid communication with the pump for receiving water that is actively flowed from the water tank;
   an ice maker, the ice maker comprising an auger at least partially surrounded by a casing, the casing in fluid communication with the third storage volume to receive water from the reservoir, the ice maker further comprising a sealed refrigeration system in thermal communication with the casing;
   a chute extending between the ice maker and the container for directing ice produced by the ice maker towards the first storage volume;
   an ultraviolet light source disposed above the reservoir along the vertical direction to selectively direct ultraviolet light into the third storage volume;
   a position sensor to detect a position of the container; and
   a controller in operative communication with the position sensor, the controller being configured to
      detect the position of the container based on a signal received from the position sensor,
      determine a sanitation condition in response to the position of the container being detected, and
      activate the ultraviolet light source based on the determined sanitation condition.

8. The stand-alone ice making appliance of claim 7, wherein the reservoir includes a removable lid mounted above the third storage volume, and wherein the ultraviolet light source is attached to the removable lid.

9. The stand-alone ice making appliance of claim 7, wherein the container further defines a drain aperture above the water tank along the vertical direction in fluid communication with the second storage volume.

10. The stand-alone ice making appliance of claim 7, further comprising:
    an outer casing defining an enclosed internal cavity, wherein the ultraviolet light source is disposed within the enclosed internal cavity.

11. The stand-alone ice making appliance of claim 10, wherein the reservoir is disposed within the enclosed internal cavity.

12. The stand-alone ice making appliance of claim 7, wherein the ultraviolet light source includes an ultraviolet light bulb to project light waves in the range of about 240 nanometers to about 270 nanometers.

13. A method of controlling an ultraviolet light source of a stand-alone ice making appliance, the appliance including a container defining a first storage volume for receipt of ice, a water storage volume facing the ultraviolet light source in fluid communication with the container, and an ice maker, the ice maker comprising an auger at least partially surrounded by a casing, the casing in fluid communication with the water storage volume, the method comprising:
    detecting a position of the container;
    determining a sanitation condition in response to detecting a position of the container; and
    activating the ultraviolet light source based on the determined sanitation condition.

14. The method of claim 13, wherein detecting a position of the container includes receiving a location signal from a position sensor.

15. The method of claim 13, wherein determining a sanitation condition includes receiving a filled signal from an ice level sensor at the first storage volume.

16. The method of claim 13, wherein determining a sanitation condition includes determining an operation state of the ice maker.

17. The method of claim 13, wherein determining a sanitation condition includes measuring an inactive time period of the ultraviolet light source.

18. The method of claim 13, wherein activating the ultraviolet light source includes initiating projection of a light waves in the range of about 240 nanometers to about 270 nanometers over a predetermined time period.

\* \* \* \* \*